Patented Sept. 1, 1936

2,052,917

UNITED STATES PATENT OFFICE 2,052,917

METHOD OF MANUFACTURING CYMENE AND TOLUENE FROM TERPENES

Hilding Olof Vidar Bergström, Stocksund, near Stockholm, and Karl Nicolaus Cederquist and Karl Gustaf Trobeck, Stockholm, Sweden No Drawing. Application November 17, 1932, Serial No. 643,120. In Sweden November 17, 1931

2 Claims. (Cl. 260—168)

When terpene vapors at increased temperatures, for instance 300–550° C., are passed over certain catalytic substances, such as silver, platinum, palladium, nickel and iron, cymene is formed thereby that two atoms of hydrogen per molecule of cymene formed are split off from the terpenes. The hydrogen gas thus liberated escapes from the reaction apparatus during the continuation of the reaction. The above mentioned catalysers are, however, too expensive for rendering possible an economical utilization of the process in practice, and moreover, they have not a sufficient duration of life, wherefore they must often be regenerated or substituted, which also causes relatively high costs. In executing the process by means of said catalyzers polymers are also easily formed.

It has now been found, that by using active carbon or similar substances it will be possible to obtain a process for transforming terpenes or terpenes-containing substances into cymene, which process is very cheap to execute and also gives a high output, besides which the advantage may be mentioned that no polymers are formed. The active carbon maintains its activity for a long time and, moreover, it is very cheap and can easily be regenerated. The activating and the regenerating of the carbon, for instance ordinary charcoal produced in a charring-stack or in a charring furnace, may be executed according to known methods, for instance by heating the charcoal with air and steam to the required temperature.

The course of the process when using active carbon is in certain respects different from that when using the above mentioned catalyzers, since only a small quantity of hydrogen gas will escape from the reaction apparatus. The greatest part of the hydrogen split off from the terpenes therefore ought to be bound by the active carbon.

As mentioned above the charcoal must be active in order to get the above mentioned action. However, it is not necessary that it is activated all through, but it is sufficient if it is activated on the surface. Ordinary carbon in the form of charcoal or other coal, which is not activated, cannot be used for the execution of the present process.

Even if the carbon used is only slightly activated the reaction takes place in the above mentioned manner.

The following description is an example of one manner of practically executing the method:

Turpentine oil with or without addition of other substances is evaporated and the vapors are superheated, for instance to 300–550° C., and passed through a reaction apparatus containing active charcoal. The terpene vapors are then through the action of the active carbon transformed into cymene vapors. If wanted the superheating of the terpene vapors may also take place directly in the reaction apparatus, in which case the latter is provided with heating means.

The cymene vapors formed in the reaction apparatus are lead off and may be passed to a cooler, where they are condensed, if cymene is to be produced, or they may be introduced into another reaction apparatus, where the cymene vapors are transformed into toluene, and in which the cymene vapors are passed over certain substances, which are adapted to split off propylene from the cymene, such as silicates, zinc chloride etc. These substances should suitably be located on porous carriers, such as pumice stone, asbestos etc.

The propylene thereby split off may be used for the production of propylene glycol, propylene chloride, propyl alcohol, acetone, etc. The toluene obtained may be used for the production of benzaldehyde, benzoic acid, trinitrotoluene etc.

It is also possible to produce toluene directly from the turpentine oil by leading vapors of the same at suitable temperature over a mixture of active carbon and one or more substances which are adapted to split off propylene from cymene, such as a mixture of active carbon and silicates or active carbon and zinc-chloride.

The turpentine oil is most adapted for the production of cymene after the pinene fraction has been driven off from the same. The vapors distilling off from the turpentine oil above 160° C. are then transformed into cymene or toluene and propylene in the above mentioned manner, while the pinene fraction can be utilized for the production of artificial camphor, terpin hydrate, terpineol and other products.

We claim:

1. Method of manufacturing cymene from turpentine oil containing pinene, comprising driving off the pinene fraction, superheating the vapors escaping from the turpentine oil after said fraction to temperatures between 300° C. to 550° C., exposing said vapors at these temperatures to the action of activated carbon, condensing the cymene vapors and recovering cymene from the condensate.

2. Method of manufacturing cymene from turpentine oil containing pinene, comprising driving off the pinene fraction, superheating the vapors escaping from the turpentine oil to between 300° C. and 550° C. after said pinene fraction has been thus removed, and exposing said vapors at these temperatures to the action of activated carbon.

HILDING OLOF VIDAR BERGSTRÖM.
KARL NICOLAUS CEDERQUIST.
KARL GUSTAF TROBECK.